Aug. 21, 1962 R. W. WAGNER 3,049,929
SPLIT DRIVE SHAFT POWER TAKE-OFF UNIT
Filed March 6, 1959 3 Sheets-Sheet 1
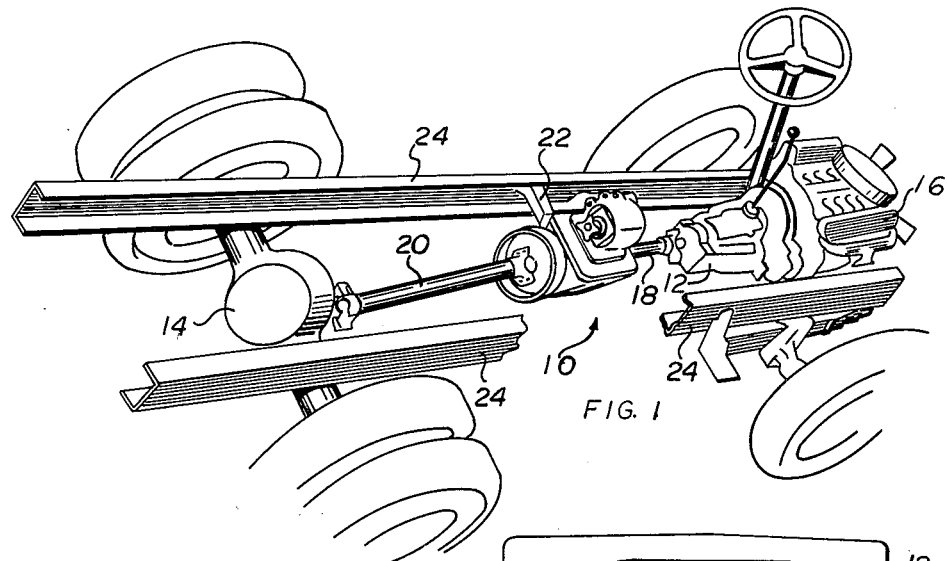
FIG. 1
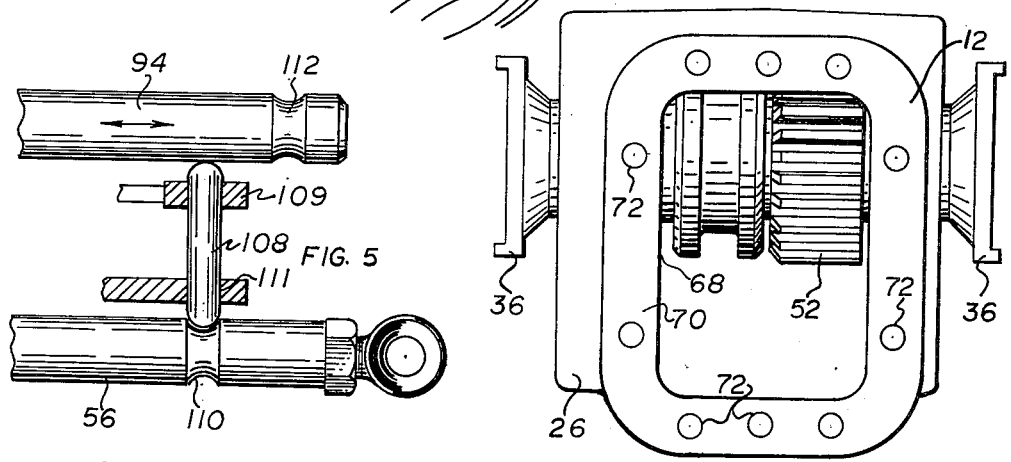
FIG. 5
FIG. 4
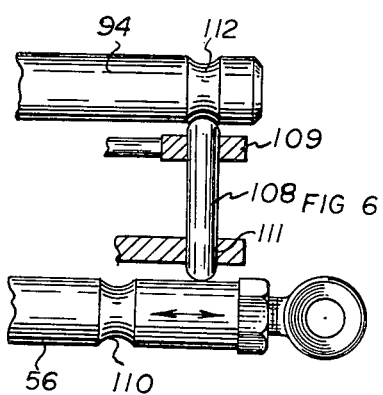
FIG 6
INVENTOR
ROBERT W. WAGNER
BY Beaman & Beaman
ATTORNEY

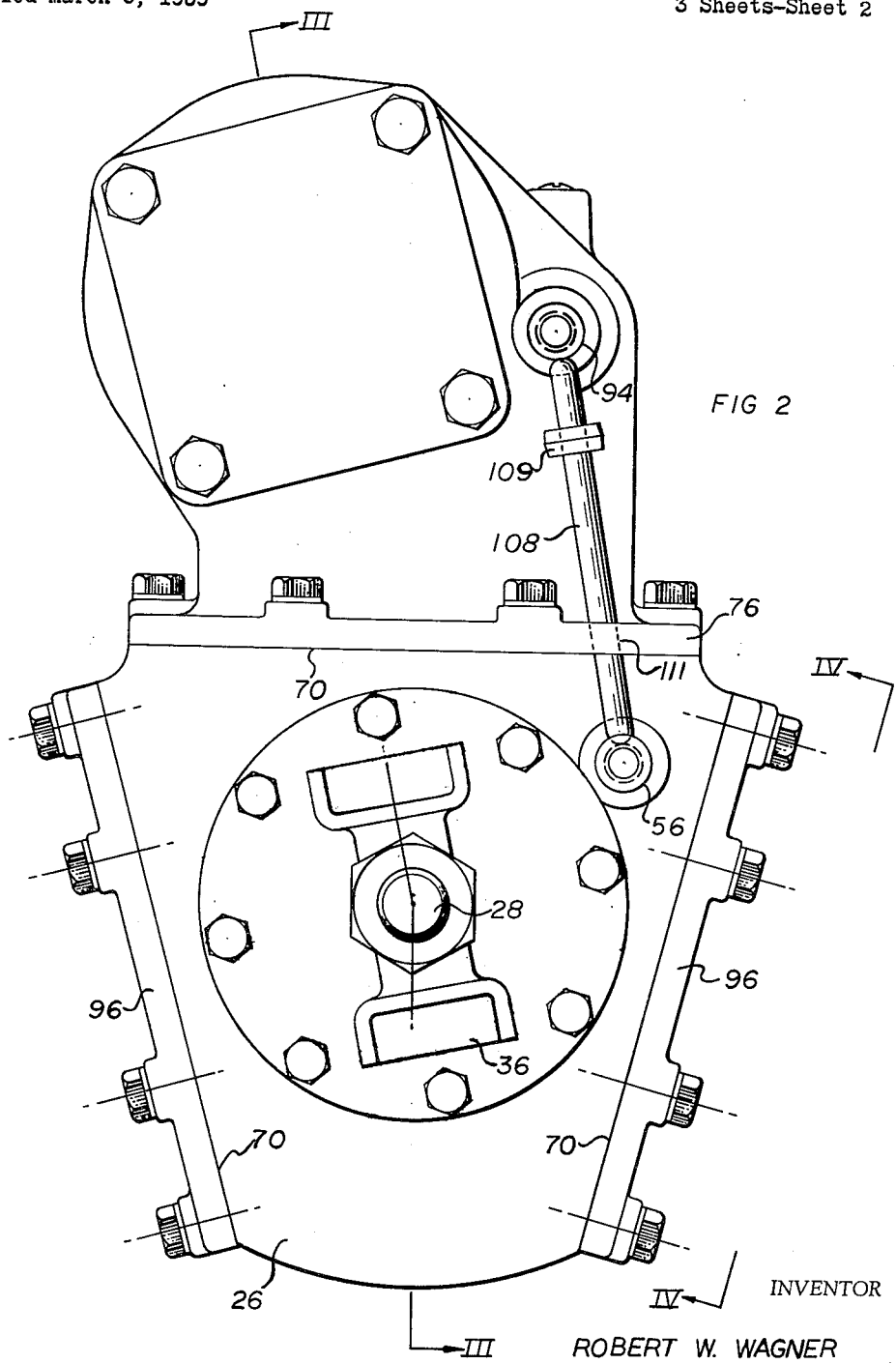

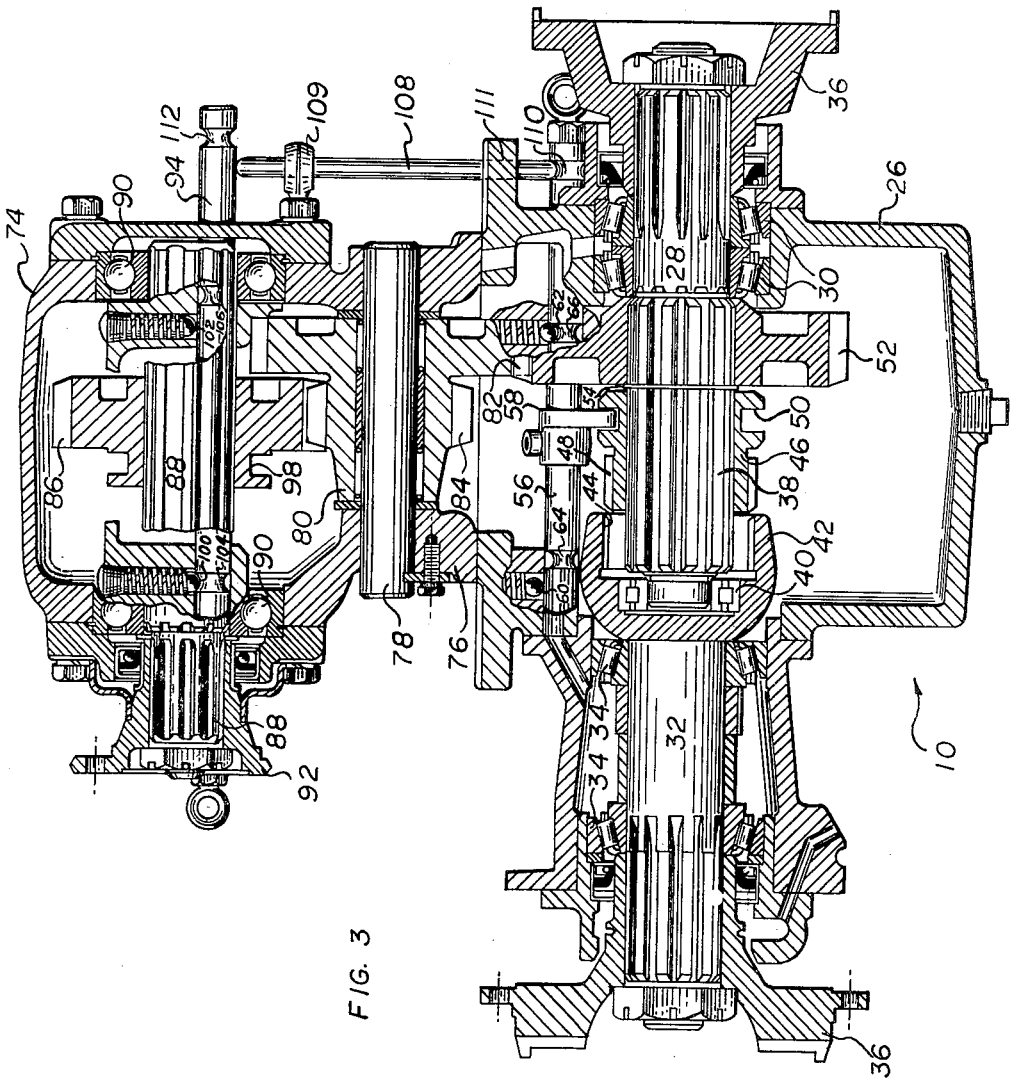

United States Patent Office 3,049,929
Patented Aug. 21, 1962

3,049,929
SPLIT DRIVE SHAFT POWER TAKE-OFF UNIT
Robert W. Wagner, Chelsea, Mich., assignor to Dana Corporation, Toledo, Ohio, a corporation of Virginia
Filed Mar. 6, 1959, Ser. No. 797,680
7 Claims. (Cl. 74—15.2)

The invention relates to split drive shaft power take off units and particularly pertains to a unit for use with power take off units of high capacity permitting several design arrangements and a plurality of power take offs to be affixed to a single split shaft housing.

The advent of auxiliary power equipment such as winches, pumps, generators, etc. on vehicles has required extensive use of power take off units which are normally affixed to the transmission housing whereby the power take off may be driven by a gear within the housing. This type of arrangement is satisfactory where the torque requirements of the power take off are relatively small, however, when a large hydraulic pump or similar mechanism requiring high torque is driven from a transmission mounted power take off unit the forces exerted on the transmission housing become excessive and often fracture the housing. It has been suggested that the transmission housing be reinforced such that power take off units of large capacity may be utilized, however, design and clearance problems make such modification impractical. A more satisfactory solution to the problem is found in the use of an auxiliary power take off support housing interposed in the vehicle drive shaft wherein adequate support for a large take off unit is provided and the drive shaft power line may be interrupted, if desired.

The invention is directed toward an improved split drive shaft unit which may be thus interposed in the drive shaft between the transmission and differential and it is an object of the invention to provide such a drive shaft unit which is capable of supporting a power take off unit transmitting full motor torque.

Another object of the invention is to provide a split drive shaft power take off assembly to which a single or a plurality of power take off units may be affixed, said units being angularly disposed about the axis of the drive shaft.

A further object of the invention is to provide a split drive shaft power take off assembly in which interlocks may be interposed between the shifting mechanism of the drive shaft unit and the power take off unit whereby the power take off may be engaged only upon interrupting the drive shaft continuity.

Yet another object of the invention is to provide a split drive shaft power take off assembly whereby the power take off may be operated when the vehicle is either stationary or in motion and which may be used to power a front wheel drive assembly if desired.

These and other objects of the invention will become apparent upon review of the accompanying description and drawings wherein:

FIG. 1 is a perspective cutaway view showing a typical installation of the drive shaft assembly in a vehicle FIG. 2 is a front elevational view of the split drive shaft assembly of FIG. 1, FIG. 3 is a elevational cross sectional view taken along the line III—III of FIG. 2, FIG. 4 is an elevational view taken along line IV—IV of FIG. 2 showing the opening within the drive shaft unit, FIG. 5 is a schematic view of the interlocking mechanism showing the relationship of the shifting rods with the power take off engaged, and FIG. 6 is a schematic view of the interlocking mechanism showing the shifter rod relationship with the power take off unit disengaged.

As seen in FIG. 1, the split drive shaft unit 10 is adapted to be affixed in the drive shaft line of a vehicle between the transmission 12 and the differential 14. The transmission being driven from a engine 16 in the conventional manner rotating a transmission output-drive shaft unit input shaft 18 and a shaft 20 connects the drive shaft unit 10 with the differential. The unit 10 is supported by cross members 22 bridging the longitudinal vehicle frame members 24 and may be positioned anywhere in the drive line where clearance is available. Universal joints are employed with shafts 18 and 20 in the normal manner to compensate for the angular relationship of the axis of the transmission, split drive shaft unit and differential.

The components of the split shaft unit 10 are best shown in FIG. 3 and include a housing 26 in which the input shaft 28 is rotatably journaled on bearings 30 and the output shaft 32 is coaxially journaled with respect to shaft 28 upon the bearings 34. The outer ends of both of these shafts are splined whereby connecting flanges 36 may be affixed to the shaft for connection with the drive shafts from the transmission and to the differential.

The portion 38 of the input shaft 28 within the housing 26 is splined and the end of the shaft is machined to a reduced diameter for support within the bearing 40. The bearing 40 is mounted on the output shaft 32 within the cup-like bell 42 and the bell is internally splined at 44.

A driving connection between shafts 28 and 32 may be selectively established by means of the clutch sleeve 46 which is splined to portion 38 for axial sliding movement thereon and is peripherally formed with spline teeth 48, which mate with spline 44, and a yoke shifter engaging groove 50. The main power take off drive gear 52 is also splined to input shaft 28 and is prevented from axial movement by abutment with the inner bearing 30 and the snap ring 54. Oil seals are used in conjunction with the shafts 28 and 32 as the housing 26 is partially filled with gear lubricant which may be drained from a plugged hole in the bottom of the housing.

Shifting of the sleeve 46 for selective engagement of spline teeth 44 and 48 is accomplished through a shifter rod 56 which slidably extends through the housing 26 parallel to the shafts 28 and 32 onto which is affixed the yoke member 58 having a transverse projection which engages groove 50 in the conventional manner. The selected axial position of the yoke and clutch sleeve 46 is maintained by a pair of spring biased detents 60 and 62 supported within the housing engageable with annular grooves 64 and 66 within the shifter rod. Thus upon engagement of detent 60 with groove 64 the sleeve 46 will be moved to the left as viewed in FIG. 3 and teeth 44 and 48 will mesh to couple the shafts 28 and 32 together. Contact of detent 62 with groove 66 positions the sleeve as shown in FIG. 3 and disengages the output shaft 32 from the input shaft 28. The shifter rod 56 is connected by a lever system to a control handle within the vehicle cab or may be air or electrically operated if desired.

The housing 26 is provided with three openings 68, one of which is shown in FIG. 4, which provide access to the gear 52. The surface 70 adjacent the openings 68 is machined planar to provide an accurate support surface for the power take off unit and a plurality of threaded holes 72 are located about the opening for receiving bolts. The size of the opening 68 and location of holes 72 is such as to comply with SAE standards for large power take off units. As seen in FIG. 2 the configuration of housing 26 is substantially triangular in cross section thereby providing an upper horizontal opening and an opening on each side of the housing facing slightly downward. Such a configuration provides three possible locations whereby a power take off may be affixed to the split drive unit and enable any desired combination of power take off units to be used. For instance, if only one take off is desired the take off will be located on the split shaft unit on the opening 68 which provides the best clearance or best aligns the take off with the equipment driven thereby. One, two or three power take off units may be affixed simultaneously to the unit as desired for driving a plurality of types of auxiliary equipment and the versatility and compact design of the split shaft unit will be readily appreciated. The fact that the side openings 68 face downward rather than horizontally usually provides adequate clearance for the power take off unit from interference with the undercarriage of the most complicated and compact vehicles. It will be appreciated that the distance from the plane of the surface 70 of each of the openings 68 to the axis of the shafts 28 and 32 are equal such that the proper gear alignment between the drive unit and power take off is maintained regardless of the location of the take off on the drive unit.

A type of power take off unit which may be driven by the split drive unit of the invention is shown in FIG. 3 and consists of a housing 74 having a support flange 76 about an opening in the housing. The lower edge of flange 76 is machined planar to engage surface 70 and bolt holes are provided in the flange whereby the power take off may be affixed to housing 26 by bolts cooperating with threaded holes 72. A shaft 78 is affixed within housing 74 and a hub 80 is rotatably journaled thereon by anti-friction bearing. The hub 80 is formed with a large gear 82, which meshes with the power take off drive gear 52, and a smaller pinion gear 84 is formed on hub 80 for selective engagement with the gear 86. The gear 86 is supported on the power take off output shaft 88 journaled with housing 74 on bearings 90 and splined intermediate the bearings whereby gear 86 may be drivingly keyed thereto and axially positionable thereon. A connecting flange 92 transmits the power take off output to the auxiliary driven equipment.

For selective operation of the power take off, a shifter rod 94, similar to that used with the drive shaft unit 10, is supported by housing 74 for axial reciprocation therein, and is provided with a yoke member, not shown, engageable with the groove 98 within gear 86. Spring loaded ball detents 100 and 102 may cooperate with grooves 104 and 106, respectively, formed in the shifter rod to maintain the desired position of the gear 86. Thus, to engage the power take off unit the rod 94 is shifted such that detent 100 engages groove 104 at which position the gears 86 and 84 will be in mesh. Engagement of detent 102 and groove 106 disengages the gears 86—84 rendering the take off unit inactive.

As the gear 52 is connected to the input shaft 28 this gear will rotate at a speed determined by the transmission output and thus all of the transmission speeds are available for driving the power take off unit. Assuming two or three take off units are affixed to the drive unit 10 each of the large gears 82 will be meshing with gear 52 at different peripheral positions thereof and the take off units may be controlled separately by their respective shifter rods. The torque and speed outputs of the several units may be varied, at a given r.p.m. of gear 52, by the use of various gear ratios between gears 84 and 86 to accommodate equipment requiring higher or lower torques than conventional. If less than three power take off units are to be used with the drive unit 10 covers 96 are bolted over the unused openings 68 to prevent entrance of foreign matter into the housing 26.

With many types of power take off applications it is highly desirable for safety reasons to prevent the power take off from being actuated while the vehicle is capable of being propelled or vice versa. Vehicles such as gas delivery trucks require this type of operation.

An interlock capable of preventing actuation of the power take off unit while power is supplied to the differential or supplying power to the differential while the power take off is in gear is easily provided with the illustrated structure. The preferred interlock is shown somewhat schematically in FIGS. 5 and 6 and consists of a vertical pin 108 which is rounded at the ends and is slidingly supported between the shifter rods 56 and 94 of the drive unit 10 and power take off respectively. Various means may be used to maintain pin 108 in this position such as a guide ring 109 secured to the housing of the power takeoff, and the pin 108 may slidingly extend through a hole 111 formed in a flange of housing 26 for further support. An annular groove 110 is formed in the shifter rod 56 so as to be engageable by the lower end of pin 108 upon moving rod 56 to the position which disengages spline teeth 44 and 48 interrupting the drive to the differential. The shifter rod 94 is formed with an annular groove 112 which is located on the rod 94 so as to align with pin 108 upon the gear 86 disengaging from gear 84 rendering the power take off inactive. Thus as in FIG. 6 when groove 112 is aligned with pin 108 the length of the pin is such that contact of the lower end of the pin with the normal diameter of rod 56 will maintain the pin 108 within the groove 112 preventing engagement of the power take off gears 84–86. The drive unit shifter rod 56 may be positioned as desired and the shifter rods will be in this position during normal operation of the vehicle.

When it is desired to operate the power take off unit the shifter rod 56 is positioned to align groove 110 with the pin 108. The pin will then drop into the groove 110, falling out of groove 112, and permit operation of shifter rod 94, see FIG. 5. When it is desired to drive the vehicle through the differential again the shifter rod 94 is positioned back to the location of FIG. 6 and rod 56 moved to the left to engage teeth 48 and 44.

It will thus be observed that the split drive shaft unit of the invention permits usage of a plurality of large power take off units from a single gear. The unit 10 may be placed at any convenient location in the drive shaft line and the housing 26 is of sufficient strength to prevent fracturing of the housing which may happen wherein power take off units are affixed directly to the transmission. Being able to interrupt the drive line permits the entire transmission output to be utilized by the power take offs and also permits a wide variety of speed ranges upon shifting of the transmission. If desired the construction of the invention is such that power for a front wheel drive may be provided by a power take off unit and as the drive unit is responsive to the speed and direction of the transmission such usage is entirely practical. The triangular configuration of the drive unit is considered an important advance in the art in that by such construction a plurality of power take off units may be affixed to the unit 10 yet the unit 10 is of small compact size and is of very high strength.

It will be appreciated that although the power take off unit is shown and described as interposed between the transmission and differential of the vehicle the take off unit may be located anywhere in the drive shaft power train and with some special vehicles such as emergency crash trucks the take off unit may be employed between the engine and torque converter transmission.

I claim:

1. In a power take off drive assembly comprising a portion of a drive line, a housing, a plurality of large openings in relation to the housing dimensions defined on said housing such that the planes of said openings intersect in triangular relationship, input and output shafts journaled in said housing, clutch means selectively operable to drivingly interconnect said shafts, the planes of each of said openings being the same distance from the axis of said input shaft, and means affixed to said input shaft adjacent said openings for driving engagement with a power take off unit when secured to one of said openings.

2. In a power take off drive assembly interposed into a vehicle drive shaft system, a housing, an input shaft journaled in said housing, an output shaft journaled in said housing, clutch means selectively operable to drivingly interconnect said shafts, a gear keyed to said input shaft for rotation therewith, a plurality of large access openings in relation to the housing dimensions defined in said housing adjacent said gear for attachment of at least one power take off unit to said housing in driven engagement with said gear, said openings being defined in said housings whereby the planes thereof intersect in triangular relationship.

3. In a split drive shaft power take off drive unit interposed in a vehicle drive system, a housing, an input shaft journaled within said housing, an output shaft journaled in said housing coaxially with said input shaft, a clutch sleeve keyed to said input shaft and axially positionable thereon for selective driving engagement with said output shaft, means adapted to position said sleeve on said input shaft, a gear keyed to said input shaft within said housing, large access openings in relation to the housing dimensions defined within said housing adjacent said gear for attachment of at least one power take off unit to said housing in driven engagement with said gear, said openings formed in said housing whereby the planes thereof intersect in a triangular relationship and are equidistant from the axis of said input shaft, one of said opening planes being disposed in a horizontal direction.

4. In a split drive shaft power take off drive unit interposed in a vehicle drive system, a housing adapted to be supported on the vehicle frame, an input shaft rotatably journaled in said housing, a splined portion formed on said shaft, a gear affixed on said splined portion and a clutch sleeve exteriorly formed with spline teeth keyed to said portion and axially positionable thereon, an output shaft journaled within said housing coaxially with respect to said input shaft, an interiorly splined bell portion formed on said output shaft engageable with the teeth of said sleeve, a shifter rod axially positionable within said housing, a yoke carried by said rod engaging said sleeve for the shifting thereof and three large access openings defined in said housing adjacent said gear whereby power take off units may be affixed to said housing in driven engagement with said gear, said openings being positioned such that the planes thereof are parallel to the axis of said shafts, equidistant therefrom, and intersect in triangular relationship, one of said opening planes being disposed in a horizontal direction.

5. In combination, a split drive shaft unit interposed in a drive shaft system and a power take off unit affixed to said drive shaft unit in driven relation thereto, first clutch means selectively interrupting the transfer of torque through said split drive shaft unit, second clutch means selectively operatively clutching said power take off unit to the drive shaft, and interlock means interposed between said first and second clutch means whereby said power take off unit may be activated only upon interruption of torque through said drive shaft unit and torque transfer through said drive shaft unit may be restored only upon declutching said power take off unit.

6. In combination, a split drive shaft unit interposed in a drive shaft system and a power take off unit affixed to said drive shaft unit in driven relation thereto, said split drive shaft unit comprising a housing, input and output shafts journaled in said housing, first clutch means selectively drivingly interconnecting said shafts, a gear affixed to said input shaft, a driven gear journaled in said power take off unit in mesh with said first mentioned gear, a second clutch means adapted to selectively drivingly interconnect said driven gear and the power take off output shaft, and an interlock interposed between said first and second clutch means preventing engagement of said second clutch upon engagement of said first clutch and preventing engagement of said first clutch upon engagement of said second clutch.

7. In a split drive shaft unit and power take off unit as in claim 6 wherein said first and second clutch means include first and second parallel axially reciprocable shifter rods, respectively, and said interlock comprises a reciprocable pin interposed between said shifter rods cooperable with depressions formed in each of said shifter rods whereby alignment of one of said depressions with said pin will lock the rod in which said aligned depression is formed upon misalignment of the pin with the depression of the other shifter rod.

References Cited in the file of this patent
UNITED STATES PATENTS

| | | |
|---|---|---|
| 2,231,144 | Wagner | Feb. 11, 1941 |
| 2,512,036 | Orr | May 22, 1947 |
| 2,680,377 | Gerst | June 8, 1954 |
| 2,755,686 | Bade | July 24, 1956 |
| 2,775,134 | Swenson | Dec. 25, 1956 |
| 2,798,382 | Fletcher et al. | July 9, 1957 |
| 2,807,962 | Howlett | Oct. 1, 1957 |
| 2,945,382 | Ritter et al. | July 19, 1960 |

FOREIGN PATENTS

| | | |
|---|---|---|
| 519,469 | Italy | June 1957 |